3,494,013
PROCESSES AND DEVICES FOR THE CUTTING OR MACHINING AND BURNISHING OF BALL SURFACES OF WORKPIECES
Rudolf Gottschald, Osterath, Germany, assignor to A. Ehrenreich & Cie., Dusseldorf-Oberkassel, Germany
Filed Mar. 16, 1967, Ser. No. 623,723
Claims priority, application Germany, Mar. 22, 1966, E 31,294
Int. Cl. B24b 39/00
U.S. Cl. 29—90                                                     3 Claims

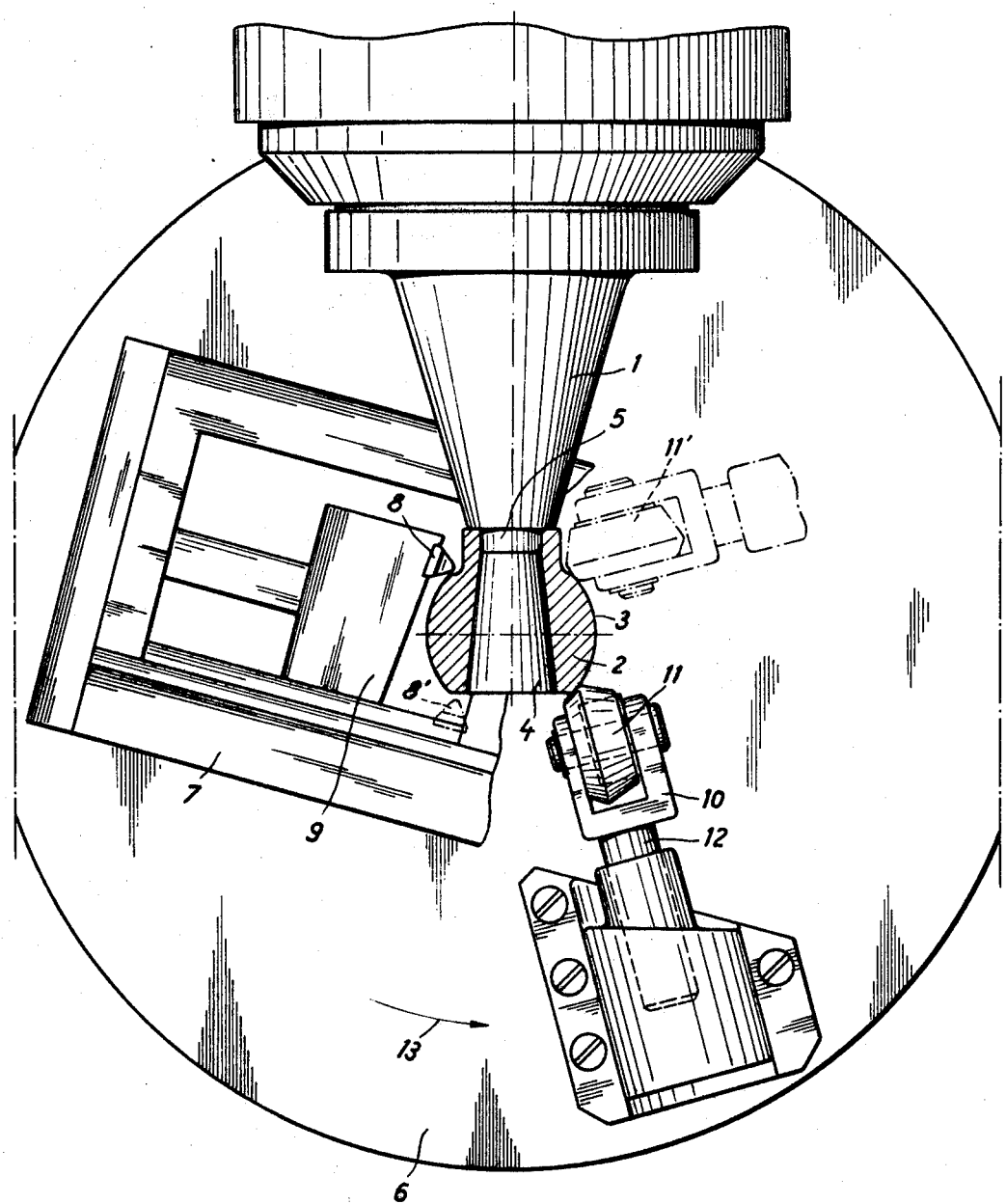

ABSTRACT OF THE DISCLOSURE

A device for the cutting and burnishing of ball surfaces of workpieces in which the workpiece is mounted in a rotating chuck. A rotary table located below the chuck is provided with a retractable cutting means and a retractable burnishing means such that with the cutting means in an advanced position and the burnishing means in a retracted position, the workpiece may be cut upon rotation of the table in one direction and, with the subsequent advancing of the burnishing means and retraction of the cutting means, the workpiece may be burnished upon rotation of the table in the opposite direction to its original position.

---

The present invention relates to a process and a device for the cutting or machining and burnishing of ball surfaces of workpieces, and more particularly of the surface of bolt and pin ball heads, preferably of ball heads of joint pins in ball joints, in which the workpiece is chucked but once.

So far the ball head of the joint pin in ball joints has first been processed by turning in a cutting or machining step. Then the ball head has been hardened and subsequently ground or polished. This way to process ball heads is expensive and time consuming.

With a view to dimensionally accurate rolling of cylindrical interior surfaces it has already been known to submit such interior surfaces first to a preprocessing step which may be a cutting step and then to plastically form the same to the accurate dimension. In this case processing tools are roller rings on a rotating cylindrical body. The preprocessing roller ring and the final processing roller ring are located behind each other on the rotating cylinder which is lowered into the bore to be rolled to accurate dimension, so that the roller rings will be effective one after the other. Such processing is not suitable for the processing of ball surfaces of workpieces, since with ball surfaces of a workpiece there is no slow-down for the first fed tool and no run-on for the second fed tool.

The primary object of the present invention is to provide a possibility to cut and burnish the ball surfaces of workpieces in which processing the workpiece is chucked but once and which processing requires but a single step.

According to the present invention this problem has been solved in that, in one swivelling direction of a tool holder rotating about an axis passing the center of the ball surface on the axis of rotation of the chucked workpiece, the cutting or machining tool and, after completed processing by means of the same, the burnishing tool in the other swivelling direction will become active.

Due to this feature total processing has been included into a step requiring but one chucking effort, since the burnishing step may be performed while the cutting tool is necessarily returning or running back into its original position, and does therefore not appear to be a separate step regarding time. The result is not only that processing has been simplified, but also that time is reduced, i.e., processing has been accelerated. Due to burnishing any inaccuracy and roughness will disappear, which, in many cases, as for instance when the ball head is supported in acetal resin surfaces, may be highly important, because in these cases, especially good surface condition of the ball head will be required.

According to the present invention a device for the realisation of the process provides for a table rotating around the axis of rotation of the chuck and the center of the ball surface of the workpiece, said table comprising a steel holder on one side of the rotation axis of the chuck and a holder supporting the burnishing tool on the other side of the rotation axis of the chuck located at an angle equal to the processing path opposite to the steel holder so that after completed cutting the burnishing tool will be opposite to the position of the cutting workpiece which the same will have at the beginning of its cutting action.

It will be practical in this connection to provide the holder or support of the tools with an advance means controlled by the direction of swivelling.

The drawing is a diagram of a preferred example of construction of a device for the performance of the process according to the present invention being a horizontal view of such device.

The outline of the socket surrounding the chuck which is to support the tool and to rotate around its axis, has been identified by 1. The workpiece 2 has a spherical outer surface 3 and is wedged on the head part 4 of the pin 5 such as the joint pin of a ball joint.

A rotating table has been defined as 6; said table is located below the workpiece in the top view as shown in the drawing, while the axis of rotation or swivelling of said table is vertically intersecting the axis of rotation of the chuck and passing the center of curvature of the ball surface. On one side of the axis of rotation of the chuck the rotating table has been provided with a holder 7 intended for the cutting tool 8 which is located on the carriage 9. On the other side of the axis of rotation of the chuck the rotating table has been provided with a holder 10 intended for the burnishing tool which is a roll. The holder 10 is supported by a hydraulic piston identified by 12 the stroke of which is controlled by swivelling of the rotating table.

In the drawing the beginning of the processing has been shown by full lines. The cutting tool is in the position where it starts cutting, while the burnishing tool 11 has been withdrawn and does not exert any pressure on the surface to be processed. The rotating table will be turned in the direction of the arrow 13 until the cutting tool will have reached its position 8' marked by a line of dots and dashes while the burnishing tool will have arrived at the position 11'. Now the cutting tool will be withdrawn for instance by contacting of its holder against a control stop while the burnishing tool will be advanced towards the spherical surface so that the burnishing roll will exert a pressure against said spherical surface. The rotating table is returned into its original position, while at the same time the burnishing roll is active and will also return into its original position to which it will be withdrawn after completed burnishing such that it will be possible to remove the workpiece from the chuck and to replace it by another workpiece to be processed. After the workpiece has been changed, the cutting tool is advanced again into its position required for cutting which advance may, for instance, also be effected by means of a control stop.

It will be possible to provide a continuous or infinitely variable control of the speed of the spindle supporting the chuck in order to obtain the same or almost the same cutting speeds.

It will also be possible to apply the present invention in an analogous manner to hollow ball surfaces, and more particularly of cases or to hollow ball bearing surfaces respectively.

I claim:
1. A device for working on spherical surfaces of workpieces, said device comprising, in combination:
   (a) a rotatable chuck means adapted to support a workpiece,
   (b) a rotatable table means located below said rotatable chuck means such that the axis of rotation of said rotatable table means vertically intersects the axis of rotation of said rotatable chuck means,
   (c) a first tool holder means mounted on said rotatable table means, said first tool holder means comprising,
      (1) a first tool means,
      (2) a first means for advancing and retracting said first tool means such that said first tool means may be advanced towards said workpiece when said rotatable table means is rotated in a first direction, and retracted away from said workpiece when said rotatable table is rotated in a second, opposite direction,
   (d) a second tool holder means mounted on said rotatable table means, said second tool holder means comprising,
      (1) a second tool means,
      (2) a second means for advancing and retracting said second tool means such that said second tool means may be retracted away from said workpiece when said rotatable table means is rotated in said first direction, and advanced towards said workpiece when said rotatable table is rotated in said second, opposite direction.

2. The device as set forth in claim 1 in which said first tool means comprises cutter means and said second tool means comprises burnishing means.

3. The device as set forth in claim 1 in which said second advancing and retracting means comprises a hydraulic piston means.

References Cited
UNITED STATES PATENTS

| | | | |
|---|---|---|---|
| 1,419,611 | 6/1922 | Buckwalter | 29—90 |
| 2,232,843 | 2/1941 | Drissner et al. | 29—90 |
| 2,431,654 | 11/1947 | White | 29—90 |
| 2,559,360 | 7/1951 | Kurzweil | 29—90 |
| 3,221,527 | 12/1965 | Roehrs | 72—199 |
| 2,153,898 | 4/1939 | Scott | 82—12 |
| 2,715,848 | 8/1955 | Schmidt | 82—12 |
| 3,301,104 | 1/1967 | Matlack | 82—12 |

MILTON S. MEHR, Primary Examiner